United States Patent [19]
Austin

[11] Patent Number: 6,029,890
[45] Date of Patent: Feb. 29, 2000

[54] USER-SPECIFIED CREDIT CARD SYSTEM

[76] Inventor: Frank Austin, c/o Saudi Aramco Riyadh Refinery (Box 20) Loss Prevention, P.O. Box 3946, Riyadh 11199, Saudi Arabia

[21] Appl. No.: 09/102,389

[22] Filed: Jun. 22, 1998

[51] Int. Cl.$^7$ ...................................................... G06K 5/00
[52] U.S. Cl. ............................................ 235/380; 235/379
[58] Field of Search ...................................... 235/379, 380

[56] References Cited

U.S. PATENT DOCUMENTS 5,485,510  1/1996  Colbert ...................................... 235/380

Primary Examiner—Harold I. Pitts

[57] ABSTRACT

A user-specified credit card system is provided including a central bank control system adapted to transmit a credit number request signal only after the receipt of a personal identification number with a desired credit limit via an ATM or the like. The credit number request signal includes the credit limit, expiration date and when desired the vendor number the credit must be spent at. A credit provider is connected to the central bank control system. The credit provider has a first mode during which the same is adapted to deploy a unique credit number upon the receipt of the credit number request signal if credit is available. The credit provider works in a second mode upon the receipt of a credit number and a purchase amount. In such mode, the credit provider serves to deploy an approval signal only if the credit limit is greater than or equal to the purchase amount. After the transmission of the approval signal, the credit number is cancelled.

11 Claims, 1 Drawing Sheet

6,029,890

USER-SPECIFIED CREDIT CARD SYSTEM

BACKGROUND OF THE INVENTION

1. Field of the Invention

The present invention relates to a user-specified credit card system and more particularly pertains to providing a system of issuing credit numbers each with a user-specified expiration date and credit limit adapted for one-time use.

2. Description of the Prior Art

The use of credit card verification systems is known in the prior art. More specifically, credit card verification systems heretofore devised and utilized for the purpose of preventing credit card fraud are known to consist basically of familiar, expected and obvious structural configurations, notwithstanding the myriad of designs encompassed by the crowded prior art which have been developed for the fulfillment of countless objectives and requirements.

By way of example the prior art includes U.S. Pat. No. 5,485,510; U.S. Pat. No. 5,023,904; U.S. Pat. No. 4,707,592; and U.S. Pat. No. 4,988,849, which are each incorporated herein by reference. The foregoing systems are inherently inferior since they permit duplication of credit cards, theft of credit numbers from vendors, loss of credit cards in mail and theft of credit cards from post office boxes and clients, etc.

In this respect, the user-specified credit card system according to the present invention substantially departs from the conventional concepts and designs of the prior art, and in so doing provides an apparatus primarily developed for the purpose of providing a system of issuing credit numbers with a user-specified expiration date and credit limit adapted for one-time use.

Therefore, it can be appreciated that there exists a continuing need for a new and improved user-specified credit card system which can be used for providing a system of issuing credit numbers with a user-specified expiration date and credit limit adapted for one-time use. In this regard, the present invention substantially fulfills this need.

SUMMARY OF THE INVENTION

In view of the foregoing disadvantages inherent in the known types of credit card verification systems now present in the prior art, the present invention provides an improved user-specified credit card system. As such, the general purpose of the present invention, which will be described subsequently in greater detail, is to provide a new and improved user-specified credit card system which has all the advantages of the prior art, none of the disadvantages and other significant additional advantages.

To attain this, the present invention essentially comprises a central bank control system adapted to transmit a verification signal upon the receipt of a correct personal identification number with a desired cash withdrawal amount. It should be noted that the central bank control system only issues the verification signal if the desired cash withdrawal amount is available in a designated bank account or falls within predetermined pre-approved credit limits. Next provided is an automated teller machine including a display, a card reader, a printer and a keypad. As shown in FIG. 1, the automated teller machine is connected to the central bank control system. In use, the automated teller machine serves for reading a magnetic strip identification card and transmitting the personal identification number with the desired cash withdrawal amount to the central bank control system. In a first mode, the automated teller machine is further adapted to dispense an amount of cash corresponding to the cash withdrawal amount upon the receipt of the verification signal from the banking control system. After such dispensing of cash, a transaction receipt is printed by the printer. For reasons that will become apparent, the automated teller machine further has a second mode for transmitting a credit number request signal. Such credit number request signal includes the credit amount and an expiration date entered via the keypad. The credit number request signal may also include a vendor identification number if desired. It should be noted that the central bank control system allows the relaying of the credit number request signal only if the correct personal identification number. With reference still to FIG. 1, a credit provider is connected to the automated teller machine via the central bank control unit. In operation, the credit provider has a first mode during which the same is adapted to deploy a unique one-time credit number upon the receipt of the credit number request signal from the automated teller machine through the bank control system. In the second mode, the automated teller machine is further adapted to print a receipt with the credit number and expiration date thereon upon the receipt thereof via the central bank control system. This option may be effected upon the depression of a print button or screen icon. In the alternative, the automated teller machine continuously displays the credit number on the display for a predetermined amount of time upon the depression of a hold button. Finally, a plurality of vendor credit card interfaces are connected to the credit provider. The vendor credit card interfaces are each equipped with a magnetic card reader and keypad for entering a credit number and a purchase amount. Upon the entry of such information, the vendor credit card interfaces transmit a corresponding charge signal to the credit provider. For reasons that will soon become apparent, each vendor credit card interface further has a display for indicating an approval upon the receipt of an approval signal. In operation, the credit provider, in a second mode, serves to deploy the approval signal to the appropriate vendor credit card interface only if the expiration date of the credit number of the received charge signal is subsequent a present date and, in some cases, the vendor number is the same as the one entered when one time credit is requested. The approval signal is further dependent on whether the credit limit is greater than or equal to the purchase amount. After the transmission of the approval signal, the credit number is cancelled and cannot be used again.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawing. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved user-specified credit card system which has all the advantages of the prior art credit card verification systems and none of the disadvantages.

It is another object of the present invention to provide a new and improved user-specified credit card system which may be easily and efficiently manufactured and marketed.

It is a further object of the present invention to provide a new and improved user-specified credit card system which is of a durable and reliable construction.

An even further object of the present invention is to provide a new and improved user-specified credit card system which is susceptible of a low cost of manufacture with regard to both materials and labor, and which accordingly is then susceptible of low prices of sale to the consuming public, thereby making such user-specified credit card system economically available to the buying public.

Still yet another object of the present invention is to provide a new and improved user-specified credit card system which provides in the apparatuses and methods of the prior art some of the advantages thereof, while simultaneously overcoming some of the disadvantages normally associated therewith.

Still another object of the present invention is to providing a system of issuing credit numbers with a user-specified expiration date and credit limit adapted for one-time use.

Lastly, it is an object of the present invention to provide a new and improved credit card system including a central bank control system adapted to transmit a credit number request signal only after the receipt of a personal identification number with a desired credit limit via an ATM or the like. The credit number request signal includes the credit limit, expiration date and when desired the vendor number the credit must be spent at. A credit provider is connected to the central bank control system. The credit provider has a first mode during which the same is adapted to deploy a unique credit number upon the receipt of the credit number request signal if credit is available. The credit provider works in a second mode upon the receipt of a credit number and a purchase amount. In such mode, the credit provider serves to deploy an approval signal only if the credit limit is greater than or equal to the purchase amount. After the transmission of the approval signal, the credit number is cancelled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawing and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawing wherein.

Similar reference characters refer to similar parts throughout the Figure.

DESCRIPTION OF THE PREFERRED EMBODIMENT

Figure 1:
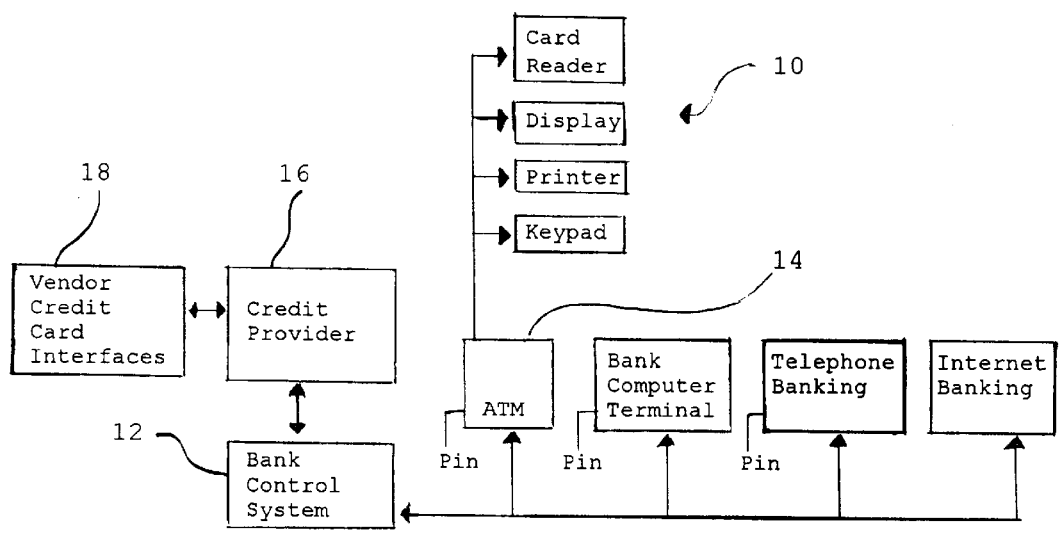
FIG. 1 is a schematic diagram of the preferred embodiment of the user-specified credit card system constructed in accordance with the principles of the present invention.

With reference now to the drawing, and in particular to FIG. 1 thereof, a new and improved user-specified credit card system embodying the principles and concepts of the present invention and generally designated by the reference numeral 10 will be described.

The present invention, the new and improved user-specified credit card system, is comprised of a plurality of components. Such components in their broadest context include a central bank control system which governs a plurality of automated teller, bank by phone, bank by Internet, bank by computer systems, etc.; a credit provider and a plurality of vendor credit card interfaces. Such components are individually configured and correlated with respect to each other so as to attain the desired objective.

More specifically, it will be noted that the system 10 of the present invention includes a central bank control system 12 adapted to transmit a verification signal upon the receipt of a correct personal identification number with a desired cash withdrawal amount. It should be noted that the central bank control system only issues the verification signal if the desired cash withdrawal amount is available in a designated bank account, as is common in the art. As shown in FIG. 1, a connection is present between the central bank control system and at least one credit provider for numerous reasons that will be set forth hereinbelow. By this interconnect, the central bank control system may issue the verification signal if the desired cash withdrawal amount is not available, as long as the credit provider indicates that credit is available.

Next provided are numerous automated teller machines 14 each including a display, a printer and a keypad. As shown in FIG. 1, each automated teller machine is connected to the central bank control system, as is conventional. In use, the automated teller machine serves for transmitting the personal identification number with the desired cash withdrawal amount to the central bank control system upon the entry thereof via the keypad or a card reader. The transaction may thereby be approved by the central bank control system with the verification signal as set forth hereinabove.

In a first mode, the automated teller machine is adapted to dispense cash in a conventional manner. In particular, the automated teller machine dispenses an amount of cash corresponding to the cash withdrawal amount only upon the receipt of the verification signal from the banking control system. After such dispensing of cash, a transaction receipt is printers by the printer. It should be noted that, in the first mode, the automated teller machine operates in a manner similar to conventional automated teller machines. As such, various other conventional transactions such as transfers, balance inquiries and the like are possible.

For reasons that will soon become apparent, the automated teller machine further has a unique second mode for transmitting a credit number request signal. This may be effected by the depression of a dedicated button on the automated teller machine or via a menu selection screen. The credit number request signal includes a credit limit, a vendor identification number(optional) and an expiration date which are both entered via the keypad. As an option, the credit number request signal may also include an identification code corresponding to one of a plurality of credit card providers. The aforementioned vendor identification number is a unique number that corresponds to a particular business or the like. Ideally, a database of vendor identification numbers is readily available over the phone or other network such as the Internet.

It should be noted that the central bank control system allows the relaying of the credit number request signal only if the correct personal identification number is received. As an option, the central bank control system may receive the credit number request signal from any secure method of entry including, not limited to, a computer terminal, a telephone, an Internet service or the like.

With reference still to FIG. 1, a plurality of credit providers 16 are connected to the automated teller machines and other entry means through the central bank control system. Each credit provider corresponds to one of the major credit card providers which are commercially available. It should be noted that the central bank control system determines to which credit provider the credit number request signal is sent as a function of which credit card provider was selected by the user.

In operation, the credit providers each have a first mode during which the same is adapted to deploy a unique one-time credit number if credit is available. The credit number is issued only upon the receipt of the credit number request signal from the automated teller machine through the bank control system. While less secure, the credit card request can be made directly to the credit providers if desired without the use of the central bank control system. Each credit number that is issued is preferably stored in a database of the credit provider and forms a subset of the person's credit obligations to the credit provider.

In its second mode, the automated teller machine is further adapted to print a receipt with the credit number thereon upon the receipt thereof via the central bank control system. This option may be effected upon the depression of a print button. In the alternative, the automated teller machine continuously displays the credit number on the display for a predetermined amount of time of about 30 seconds upon the depression of a hold button. As such, user may have adequate time to write down the credit number, expiration date and vendor identification number, if applicable.

Finally, a plurality of vendor credit card interfaces 18 are connected to the credit providers. The vendor credit card interfaces are preferably situated at point-of-sale locations and are each equipped with a keypad for entering a credit number, the vendor identification number and a purchase amount. Upon the entry of such information, the vendor credit card interface transmits a corresponding charge signal to the credit provider. In the alternative, the information included with the charge signal may simply be communicated vocally over the phone. Further, it should be understood that the point-of-sale may be over the telephone, Internet or the like. For reasons that will soon become apparent, each vendor credit card interface further has a display for indicating an approval upon the receipt of an approval signal.

In operation, the credit provider, in a second mode, serves to deploy the approval signal to the appropriate vendor credit card interface only if the expiration date of the credit number of the received charge signal is subsequent a present date. The approval signal is further only transmitted if the credit limit is greater than or equal to the purchase amount and the vendor identification number is verified. This verification of the vendor identification number may be effected either manually or automatically. After the transmission of the approval signal, the credit number is cancelled and cannot be used again. As an option, the credit provider may be adapted to cancel the credit number automatically if the above conditions are not met at the point-of-sale.

As an option, the user may be further allowed to indicate whether the credit number can be used for a purchase amount that is less than the credit limit or if it must be equal thereto. Such determination would be included in the credit number request signal set forth hereinabove.

The present invention thus offers a solution to the exuberant amount of credit card fraud present today. By employing the secure banking serves of a central bank control system, the issuance of a credit number is possible which is approved or disapproved on the spot in a safe manner. It is imperative that the credit number have a user selected expiration date, associated vender designation and maximum amount. As such, a user may obtain a card number which is specifically tailored for a purchase. For example, a person paying a bill for a certain amount which is due on a certain date may request a credit number with an associated amount equal to the certain amount, a designated vendor and an expiration date shortly after the bill due date. Overall fraud and misuse of credit cards is abated by issuing credit numbers with limited life spans, designated vendors and credit limits.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawing and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved user-specified credit card system comprising, in combination:

a central bank control system adapted to transmit a verification signal upon the receipt of a correct personal identification number with a desired cash withdrawal amount which is available in a designated bank account;

an automated teller machine including a display, a card reader, a printer and a keypad, the automated teller machine connected to the central bank control system, the automated teller machine adapted for transmitting the personal identification number with the desired cash withdrawal amount to the central bank control system upon the entry thereof via the keypad, the automated teller machine, in a first mode, further adapted to dispense an amount of cash corresponding to the cash withdrawal amount upon the receipt of the verification signal from the banking control system after which a transaction receipt is printed by the printer, the automated teller machine further having a second mode for transmitting a credit number request signal, wherein the credit number request signal includes the credit limit and an expiration date entered via the keypad;

said central bank control system adapted to relay the credit number request signal only after the receipt of the correct personal identification number;

a credit provider connected to the automated teller machine and central bank control unit, the credit provider having a first mode during which the same is adapted to deploy a unique one-time credit number upon the receipt of the credit number request signal from the automated teller machine through the bank control system;

said automated teller machine, in the second mode, further adapted to print a receipt with the credit number thereon upon the receipt thereof via the central bank control system and the depression of a print button, the automated teller machine further adapted to continuously display the credit number on the display upon the receipt thereof via the central bank control system and the depression of a hold button; and a plurality of vendor credit card interfaces each having a keypad for entering a credit number and a purchase amount and transmitting a corresponding charge signal, each vendor credit card interface further having a display for indicating an approval upon the receipt of an approval signal;

said credit provider further connected to the vendor credit card interfaces and, in a second mode, adapted to deploy the approval signal to the appropriate vendor credit card interface only if the expiration date of the credit number of the received charge signal is subsequent a present date and if the credit limit is greater than or equal to the purchase amount, wherein after the transmission of the approval signal, the credit number is cancelled.

2. A user-specified credit card system comprising:

a central bank control system adapted to transmit a credit number request signal only after the receipt of a correct personal identification number with a desired credit limit, wherein the credit number request signal includes the requested credit limit; and a credit provider connected to the central bank control system, the credit provider having a first mode during which the same is adapted to deploy a unique credit number to the bank control system upon the receipt of the credit number request signal;

said credit provider, in a second mode, adapted to deploy an approval signal upon the receipt of an entered credit number only if the associated credit limit is greater than or equal to an entered purchase amount, wherein after the transmission of the approval signal, the credit number is cancelled.

3. A user-specified credit card system as set forth in claim 2 wherein the credit number request signal is sent only after the receipt thereof via entry means, wherein the personal identification number and the desired credit limit is also provided to the central bank control system via the entry means.

4. A user-specified credit card system as set forth in claim 3 wherein the entry means includes an automated teller machine.

5. A user-specified credit card system as set forth in claim 3 wherein the entry means includes a computer banking terminal.

6. A user-specified credit card system as set forth in claim 3 wherein the entry means includes a telephone.

7. A user-specified credit card system as set forth in claim 4 wherein the automated teller machine is further adapted to print a receipt with the credit number thereon upon the receipt thereof via the central bank control system and the depression of a print button.

8. A user-specified credit card system as set forth in claim 4 wherein the automated teller machine is further adapted to continuously display the credit number on the display upon the receipt thereof via the central bank control system and the depression of a hold button.

9. A user-specified credit card system as set forth in claim 2 wherein the purchase amount is entered by one of a plurality of vendor credit card interfaces connected to the credit provider, wherein the vendor credit card interface is adapted to indicate an approval upon the receipt of the approval signal.

10. A user-specified credit card system as set forth in claim 2 wherein the credit number request signal further includes an expiration date and the credit provider, in the second mode, is adapted to deploy an approval signal only if the expiration date of the credit number is subsequent a present date.

11. A user-specified credit card system as set forth in claim 2 wherein the credit number request signal further includes a vendor identification number and the credit provider, in the second mode, is adapted to deploy an approval signal only if the vendor indentification number is properly identified.

* * * * *